(12) United States Patent
Shah et al.

(10) Patent No.: US 7,475,160 B1
(45) Date of Patent: Jan. 6, 2009

(54) METHOD AND APPARATUS FOR A RUMOR BASED PROTOCOL FOR DISTRIBUTED STATE SYNCHRONIZATION BETWEEN REQUEST ROUTING SERVERS

(75) Inventors: Mehul S. Shah, Campbell, CA (US); J Eric Mowat, Piedmont, CA (US); Szu-Wen Kuo, Milpitas, CA (US)

(73) Assignee: Network Appliance Inc., Sunnyvale, CA (US)

( * ) Notice: Subject to any disclaimer, the term of this patent is extended or adjusted under 35 U.S.C. 154(b) by 941 days.

(21) Appl. No.: 10/228,661

(22) Filed: Aug. 26, 2002

(51) Int. Cl.
*G06F 15/16* (2006.01)
*G06F 15/173* (2006.01)

(52) U.S. Cl. .................. 709/242; 709/202; 709/217

(58) Field of Classification Search .......... 709/202, 709/234, 235, 226, 217, 242
See application file for complete search history.

(56) References Cited

U.S. PATENT DOCUMENTS

| | | | | |
|---|---|---|---|---|
| 5,850,517 A | * | 12/1998 | Verkler et al. | 709/202 |
| 6,006,264 A | * | 12/1999 | Colby et al. | 709/226 |
| 6,041,342 A | * | 3/2000 | Yamaguchi | 709/202 |
| 6,154,778 A | * | 11/2000 | Koistinen et al. | 709/228 |
| 6,173,311 B1 | * | 1/2001 | Hassett et al. | 709/202 |
| 6,175,869 B1 | * | 1/2001 | Ahuja et al. | 709/226 |
| 6,185,601 B1 | * | 2/2001 | Wolff | 709/203 |
| 6,195,680 B1 | * | 2/2001 | Goldszmidt et al. | 709/203 |
| 6,230,210 B1 | * | 5/2001 | Davies et al. | 709/248 |
| 6,292,824 B1 | * | 9/2001 | Siksa | 709/202 |
| 6,314,463 B1 | * | 11/2001 | Abbott et al. | 709/224 |
| 6,324,580 B1 | * | 11/2001 | Jindal et al. | 709/228 |
| 6,377,975 B1 | * | 4/2002 | Florman | 709/203 |
| 6,434,546 B1 | * | 8/2002 | Williamowski et al. | 707/3 |
| 6,735,169 B1 | * | 5/2004 | Albert et al. | 370/229 |
| 6,832,253 B1 | * | 12/2004 | Auerbach | 709/226 |
| 7,062,562 B1 | * | 6/2006 | Baker et al. | 709/227 |
| 2001/0052016 A1 | * | 12/2001 | Skene et al. | 709/226 |
| 2002/0038360 A1 | * | 3/2002 | Andrews et al. | 709/223 |
| 2002/0062334 A1 | * | 5/2002 | Chen et al. | 709/200 |
| 2002/0124080 A1 | * | 9/2002 | Leighton et al. | 709/224 |
| 2004/0044771 A1 | * | 3/2004 | Allred et al. | 709/227 |

OTHER PUBLICATIONS

Russell Kay, *Web Caching*, Knowledge Center Web Site Management, Computerworld, Aug. 19, 2002, 1 page.

* cited by examiner

*Primary Examiner*—Glenton B Burgess
*Assistant Examiner*—Philip J Chea
(74) *Attorney, Agent, or Firm*—Blakely, Sokoloff, Taylor & Zafman LLP

(57) ABSTRACT

A method and apparatus for a rumor based protocol for distributed state synchronization between request routing servers have been described. State synchronization is maintained between routing servers via agents that respond with information requested by the servers.

10 Claims, 9 Drawing Sheets

METHOD AND APPARATUS FOR A RUMOR BASED PROTOCOL FOR DISTRIBUTED STATE SYNCHRONIZATION BETWEEN REQUEST ROUTING SERVERS

FIELD OF THE INVENTION

The invention pertains to data networks. More particularly, the invention relates to a method and apparatus for a rumor based protocol for distributed state synchronization between request routing servers.

BACKGROUND OF THE INVENTION

Fault resilience and synchronization in networks are important issues for better performance from a network. Fault resilience refers to the ability of a network to continue to operate when portions of the network (for example, servers) may not be operating properly and/or recover when the previously non-operating portions are again operating within the network. For example, if a network is not fault resilient then a single fault may make the entire network unavailable to many different network entities (clients, servers, etc.). Synchronization refers to portions of the network (for example, servers, caches, DNSs) having the most current information related to a function. For example, if a network is not in synchronization with respect to DNS entries, then parties may be sent to non-existent resources (such as servers). If a network is not in synchronization with respect to content, then a server may send a client old information. If a network is not in synchronization with respect to the best route for obtaining information, then the delivery of such information may be delayed (such as a slower response time).

A conventional approach to fault resilience may store routes of communication in a persistent store, such as a disk drive, which requires disk space, disk I/O, and disk data management. Additionally, conventional approaches may not use self-healing techniques, and thus, if a resource is returned to service after a disruption it may lose all existing route information.

Conventional approaches for synchronization may use explicit communications between global resource manager (GRM) servers for synchronization. This may lead to communications between servers on the order of n*(n−1) where n is the number of GRM servers in a system.

As the speed of communication increases, and content that is sensitive to disruption and/or delay and/or latency issues (such as streaming video) is communicated, networks without fault resilience and synchronization may present problems.

BRIEF DESCRIPTION OF THE DRAWINGS

The invention is illustrated by way of example and not limitation in the figures of the accompanying drawings, in which like references indicate similar elements and in which.

DETAILED DESCRIPTION

A method and apparatus for a rumor based protocol for distributed state synchronization between request routing servers are described.

Figure 1:
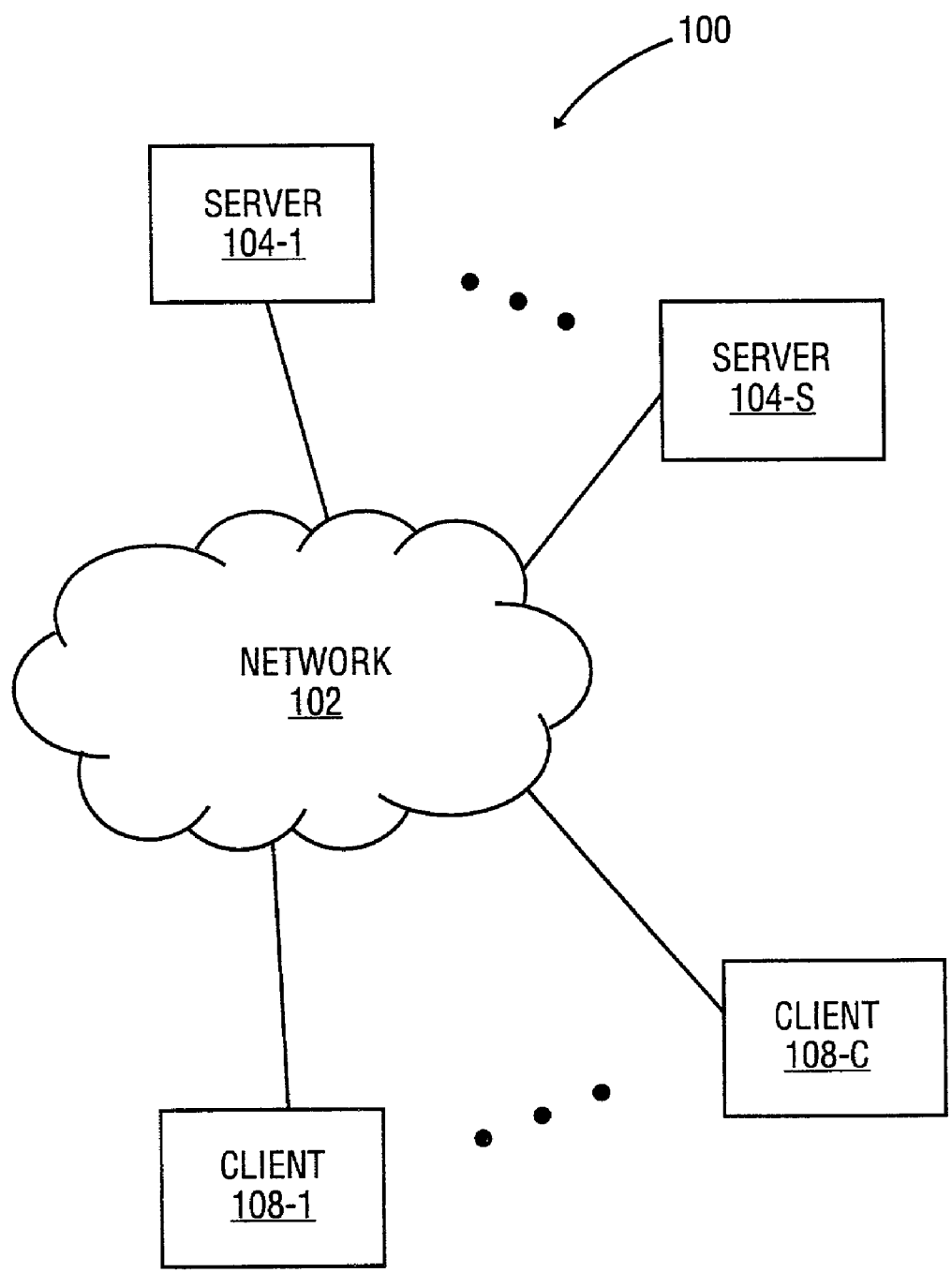
FIG. 1 illustrates a network environment in which the method and apparatus of the invention may be implemented.

FIG. 1 illustrates a network environment 100 in which the techniques described below may be applied. The network environment 100 has a network 102 that connects a number S of servers 104-1 through 104-S, and a number C of clients 108-1 through 108-C.

Figure 2:
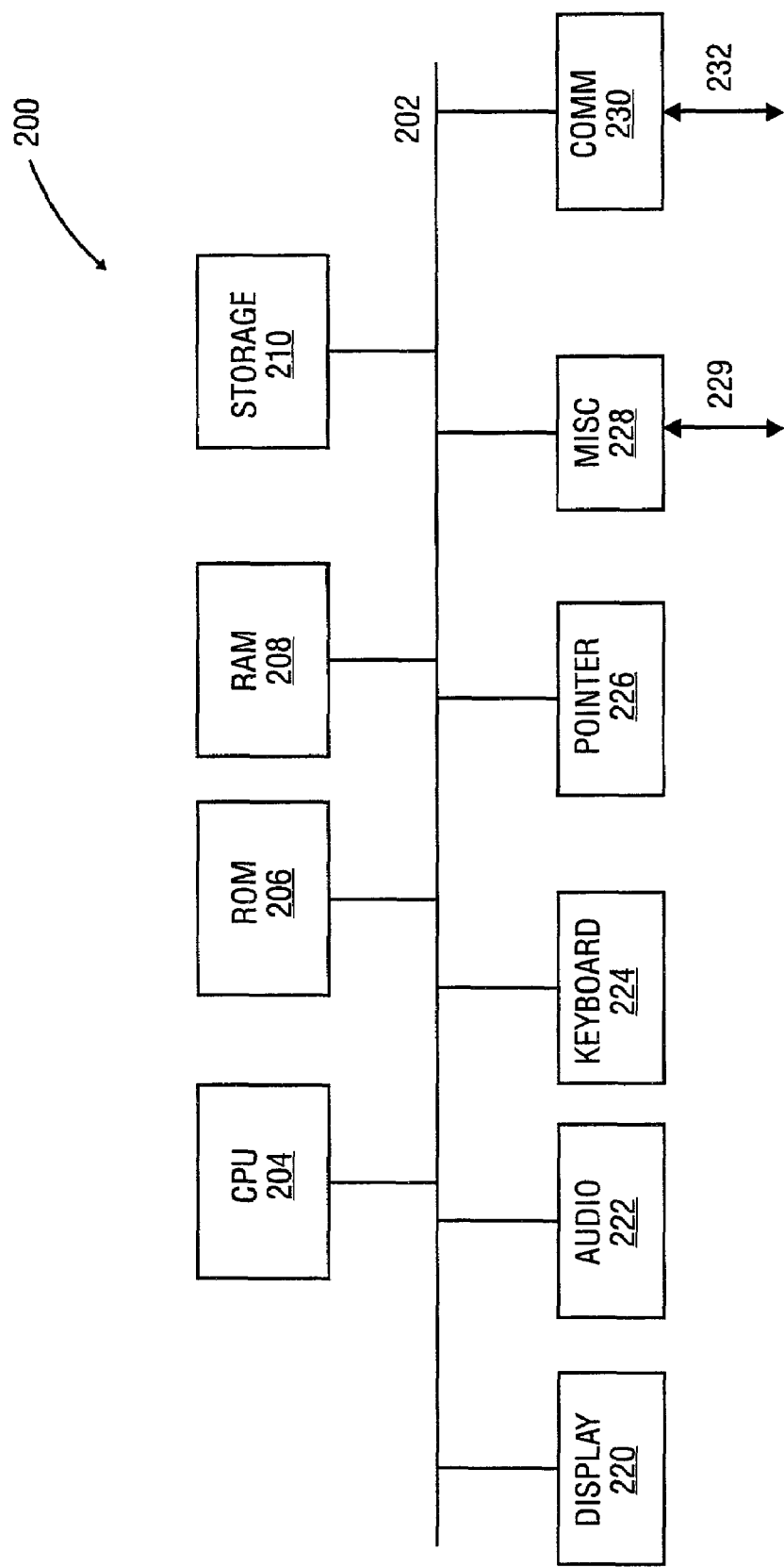
FIG. 2 is a block diagram of a computer system which may implement one embodiment of the invention.

FIG. 2 illustrates a computer system 200 in block diagram form, which may be representative of any of the clients and/or servers shown in FIG. 1.

A Global Request Manager (GRM) is a request routing system that attempts to redirect a client requesting information (such as an application, a website, a streaming object, etc.) to the network entity (such as a cache) that is closest to the client (in terms of network proximity) and capable of responding to the request. The GRM of the invention has an architecture that allows it to maintain distributed state through an efficient communication protocol and provides fault resilience in the case of various failures.

The invention in one embodiment provides state synchronization between GRM (Global Request Manager) servers so that all of the GRM servers see the same set of client IP addresses.

In yet another embodiment of the invention, fault resilience is available as long as a single cache is available. This allows the distributed information on the state of the network to be reconstructed. The state of the network includes addresses (or other identifying information) of network entities which have contacted the GRM server and proximity measured by agents. Loss of this state information would mean that future clients may not be properly redirected to the closest cache while the state information is being rebuilt.

The architecture of the invention simplifies deployment of GRM product by tolerating failure of portions of the network infrastructure with little or no loss in quality of service. The architecture ensures synchronization between the GRM servers without any explicit synchronization communications between them and ensures that every GRM server and GRM agent report consistent results.

In one embodiment of the invention, a GRM product may have GRM servers and GRM agents. GRM servers redirect clients to the closest GRM agent. For redundancy there may be more than one GRM server deployed in the system. There may be many GRM agents deployed across several geographic locations.

In one embodiment of the invention architecture, each GRM server has a list of other GRM agents present in the system and vice versa. A GRM server does not know of the other GRM servers in the system, nor do GRM agents know other GRM agents in the system. The GRM servers are synchronized with respect to each other without direct synchronization communications with each other. They are synchronized through the agents. This synchronization through the agents is called a "rumor" because it is not a direct communication from a server to a server but instead is agent to server and is based on what the agent says and what the server hears rather than direct knowledge (i.e. a rumor).

GRM DNS Redirection

For example, in one embodiment of the invention, a GRM server may learn of a new client Local DNS through:

1. A DNS lookup request from the client Local DNS; and/or

2. A probe measurement report by a GRM agent.

To illustrate, consider the scenario that includes two GRM servers G1 and G2. Each GRM server knows the agents A1, A2 and A3. G1 and G2 have no knowledge of each other. Synchronization between G1 and G2 is achieved through the agents A1, A2 and A3.

Consider the following sequence of events:
1. Client C1 sends a request through its local DNS server L1 to G1.
2. G1 instructs A1, A2 and A3 to probe L1 since this is the first time it has received a DNS lookup request from L1.
3. Server G1 responds with a "best guess" based on matching the client IP address with internal tables.
4. Agents A1, A2 and A3 initiate probe measurements to L1. G1 updates its tables and responds to L1.
5. Agents A1, A2 and A3 report back to both servers (G1 and G2). Subsequent requests from C1 are directed to use the closest measured agent. G2 learns about the new local DNS (L1) and updates its tables.

This architecture allows G1 and G2 to be synchronized, (i.e. they have the same data set of client Local DNS) without any direct communications between G1 and G2.

An alternative mechanism would have been for G1 to update G2 and vice versa for each client Local DNS they learn, but such an explicit model of synchronization may result in more messages on the network. Also, the number of messages increases exponentially. So if the system had G1, G2 and G3, it would require G1 to send messages to G2 as well as G3, the system would have a total number of messages on the order of n*(n−1). In one embodiment of the invention, the architecture may require no additional messages since all updates are broadcast to the servers irrespective of the requestor. The GRM servers are synchronized as a result (side-effect) of the proximity reports generated by the GRM agents.

GRM Application Redirection

In one embodiment of the invention, a GRM server may redirect a client at the application layer.

To illustrate, consider the scenario that includes two GRM servers G1 and G2. Each GRM server knows the agents A1, A2 and A3. G1 and G2 have no knowledge of each other. Synchronization between G1 and G2 is achieved through the agents A1, A2 and A3.

Consider the following sequence of events:
1. Client C1 sends a request to G1.
2. G1 instructs A1, A2 and A3 to probe C1 since this is the first time it has received a request from C1.
3. A1, A2 and A3 do proximity probes to C1.
4. A1, A2 and A3 report results to both G1 and G2. G1 updates its tables and responds to the client C1 to use the closest of the three (A1, A2 or A3). G2 learns about C1 the first time from the GRM agents, it updates its tables as a new entry.

This architecture allows G1 and G2 to be synchronized, (i.e. they have the same data set about client C1) without any direct communications between G1 and G2.

An alternative mechanism would have been for G1 to update G2 and vice versa for each client they learn, but such an explicit model of synchronization may result in more messages on the network. Also, the number of messages increases exponentially. So if the system had G1, G2 and G3, it would require G1 to send messages to G2 as well as G3, the system would have a total number of messages on the order of n*(n−1). In one embodiment of the invention, the architecture may require no additional messages since all updates are broadcast to the servers irrespective of the requestor. The GRM servers are synchronized as a result (side-effect) of the proximity reports generated by the GRM agents.

One of skill in the art will note that the GRM DNS redirection embodiment and the GRM Application layer redirection embodiment discussed above may be viewed from the client perspective as the client having its own "client's agent." That is, the "client's agent" may be viewed to mean the local DNS acting on behalf of the client in the case of GRM DNS redirection and the client acting on its own behalf in the case of GRM Application layer redirection. The discussion of the invention in various embodiments may refer to the DNS or Application layer redirection for specificity in explaining the embodiments, however, it is to be appreciated that the techniques discussed are applicable to both DNS and Application layer redirection. Further, as will be detailed later, the embodiments are not limited to DNS and Application only. Thus, when reference is made to a client's agent, it is to be understood that the client's agent may be requesting any network accessible information of which DNS and application are but examples. This concept of the client's agent is not to be confused with the GRM agent, which is an entirely different entity.

GRM Fault Resilience

In yet another embodiment of the invention, the architecture has fault resilience. For example, assume that G1 was up for several days and suffered a hardware failure and, as a result lost, all information related to the network. When G1 is fixed and resumes operation, it sends a resynchronize message to the agents A1, A2 and A3, and they update GRM server G1 with all the routes. G1 is resynchronized by the agents through a self-healing mechanism rather than re-learning from the clients' Local DNS servers. This self-healing resynchronization mechanism also applies to agents. For example, if an agent A1 were to fail and subsequently resume operation, it would resynchronize its state from the GRM servers G1 and G2. Likewise in an embodiment for application layer redirection, the agents and servers may be resynchronized via the same technique to re-learn the client-application information rather than re-learning it from the client.

Figure 3A:
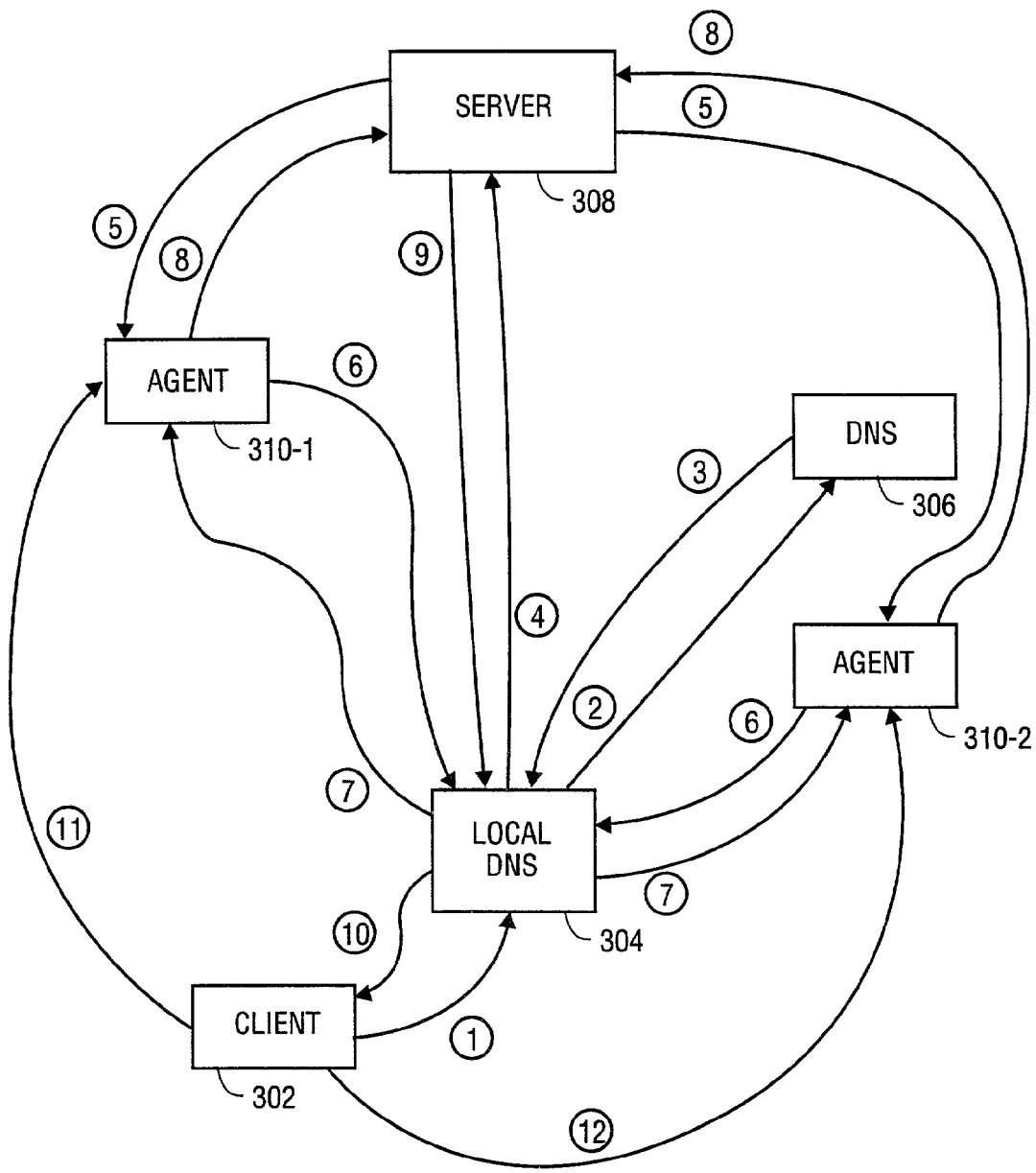
FIG. 3A illustrates one embodiment of the invention showing DNS redirection.

FIG. 3A illustrates one embodiment of the invention. For illustrative purposes only, and so as not to obscure the principles of the invention, the network has been limited to one client 302, one local domain name server (DNS) 304 for the client 302, one DNS 306, one server 308, and two agents 310-1 and 310-2. An example of the operation of the system in FIG. 3A is as follows.

Client 302 communicates (1) to the local DNS 304 to look up, for example, www.yahoo.com. The local DNS 304 then communicates (2) to the root name server DNS 306 asking who is the name server responsible for www.yahoo.com. The DNS 306 responds (3) to the local DNS 304 with an answer. The local DNS 304 then sends (4) a DNS request for www.yahoo.com to the server 308. The server 308, in this scenario, not having received a request from the local DNS 304 before, sends out a communication (5) for all agents (310-1, and 310-2 in this example) to probe local DNS 304. Each agent (310-1, and 310-2 in this example) probes (6) and (7) the local DNS 304, to determine the latency between that agent and DNS 304, for example, and all agents (310-1, and 310-2 in this example) report back (8) the probe results.

Notwithstanding this initial probe of the local DNS 304 by the agents, the server 308 will respond (9) to the local DNS (LDNS) 304 with a "best guess" based on matching the LDNS 304 IP address with internal tables. This "best guess" on which agent is closest to the LDNS may be based on such things as IP address prefixes being close, geographic tables based on IP addresses (such as Internet Assigned Number Authority tables), etc. The local DNS 304 then returns (10) to the client 302 an indication that a "best guess" agent 310-1 is the network entity from which to obtain the content corresponding to www.yahoo.com. Client 302 then proceeds (11) to obtain the content from agent 310-1 using, for example, a conventional HTTP request.

Now, assume that in this example, the probe report from agent 310-2 indicates a lower time latency than that from agent 310-1. Server 308 updates its tables and when a subsequent request for content from www.yahoo.com is received, the server 308 then communicates (9) to the local DNS 304 the IP address of agent 310-2 because it is the "closest" agent to the local DNS 304, from a network latency standpoint, having the information requested by the client 302. The local DNS 304 then returns (10) to the client 302 an indication that agent 310-2 is the network entity from which to obtain the content corresponding to www.yahoo.com. Client 302 then proceeds (12) to obtain the content from agent 310-2 using, for example, a conventional HTTP request. As will be noted, if the initial "best guess" was subsequently determined to be closest, this information would be updated in the server 308 and would no longer be a "best guess" but based on actual probe measurements by the agents.

Figure 3B:
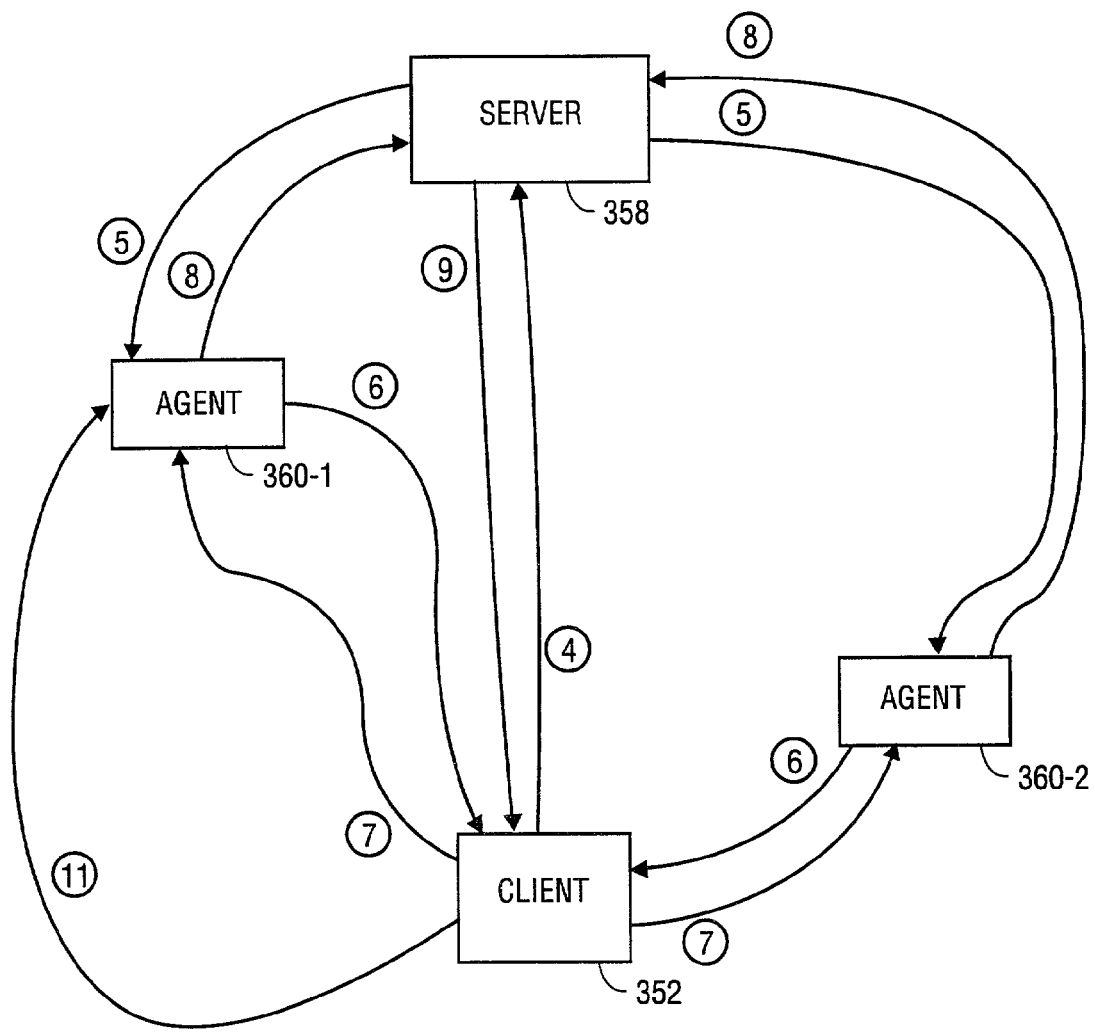
FIG. 3B illustrates one embodiment of the invention showing application layer redirection.

FIG. 3B illustrates one embodiment of the invention showing application layer redirection. For illustrative purposes only, and so as not to obscure the principles of the invention, the network has been limited to one client 352, one server 358, and two agents 360-1 and 360-2. An example of the operation of the system in FIG. 3B is as follows.

Client 302 communicates (4) a request to the server 358 for an application. The server 358, in this scenario, not having received a request from the client 352 before, sends out a communication (5) for all agents (360-1, and 360-2 in this example) to probe client 352. Each agent (360-1, and 360-2 in this example) probes (6) and (7) the client 352, to determine the latency between that agent and client 352, for example, and all agents (360-1, and 360-2 in this example) report back (8) the probe results.

Assume that in this example, the probe report from agent 310-1 indicates a lower time latency than that from agent 310-2. Server 358 then responds (9) to the client 352 by re-encoding the application request to contain the IP address of agent 310-1 because it is the "closest" agent to the client 352, from a network latency standpoint, having the information requested by the client 352. The client 352 then proceeds (11) to obtain the content from agent 310-1 using, for example, a conventional HTTP request.

The reader will note, that in the application embodiment discussed above, the server 358 provides the "closet" source for the client 352 request the first time, whereas in the DNS embodiment the first response will be a "best guess" if the client 302 via the local DNS 304 has not been previously probed.

One skilled in the art will appreciate that in a large network, there are multiple clients, local DNSs, DNSs, servers, and possibly many more agents. Additionally, one skilled in the art will recognize that by redirecting a client request to an agent, the agent such as described above may act as a server for content/application. However, an agent can also be more than merely a server for content/application. As illustrated above an agent may also probe the local DNS or client for information on parameters such as latency.

Server Resiliency

Figure 4A:
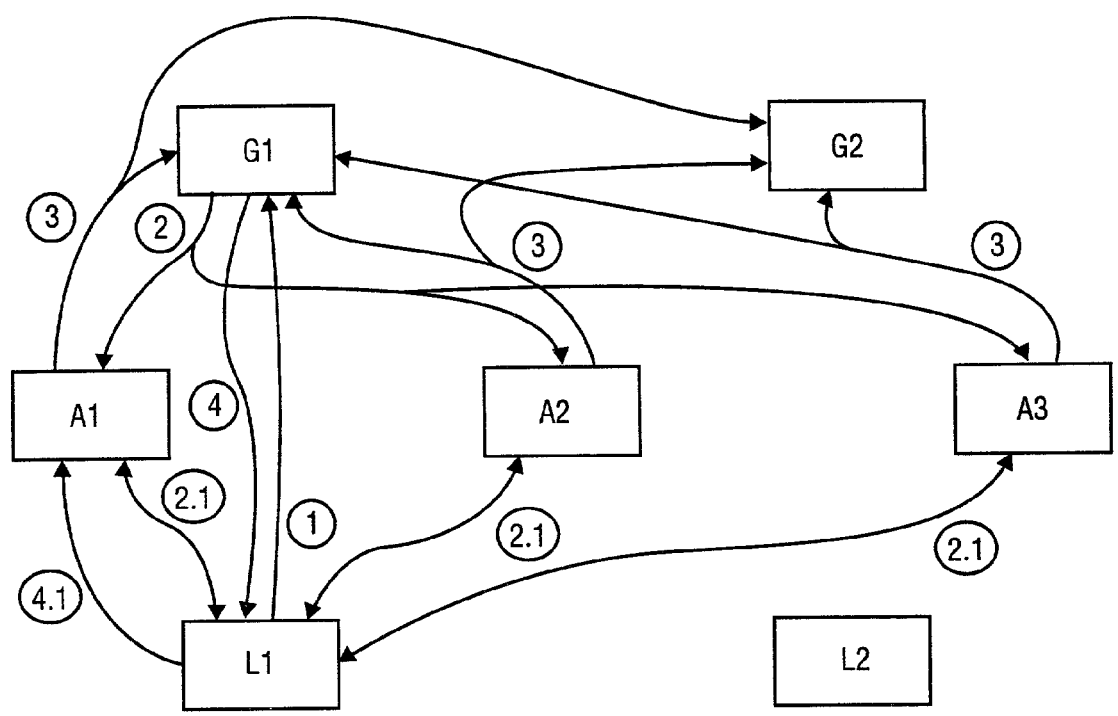
FIGS. 4A, 4B, and 4C illustrate one embodiment of the invention demonstrating server resiliency.
Figure 4B:
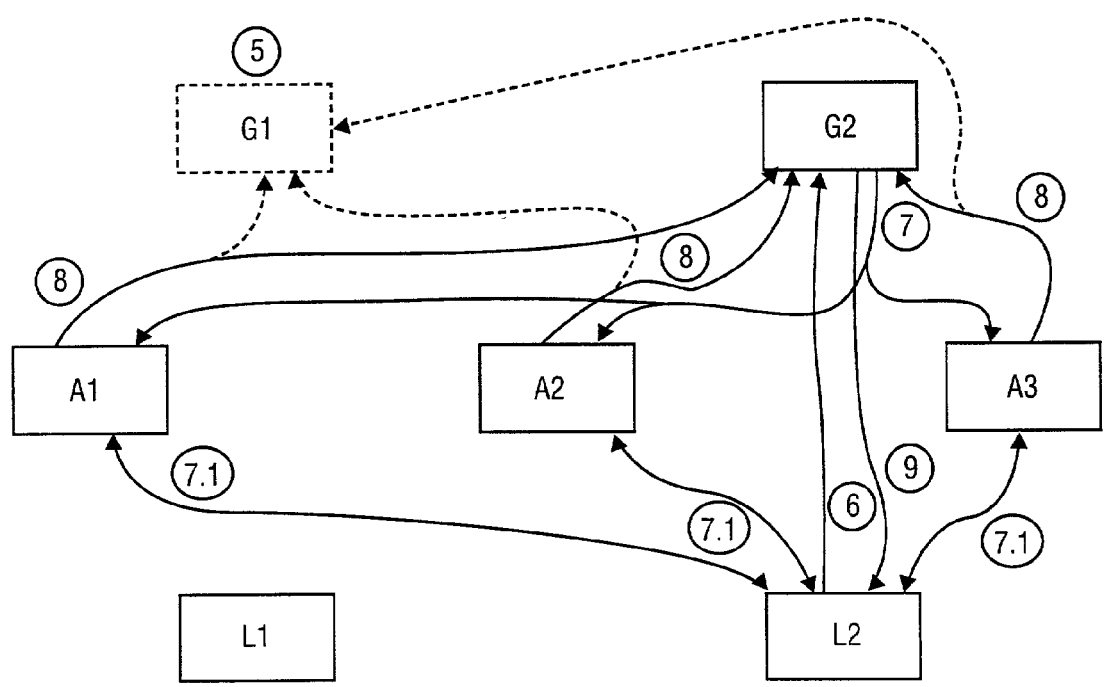
Figure 4C:
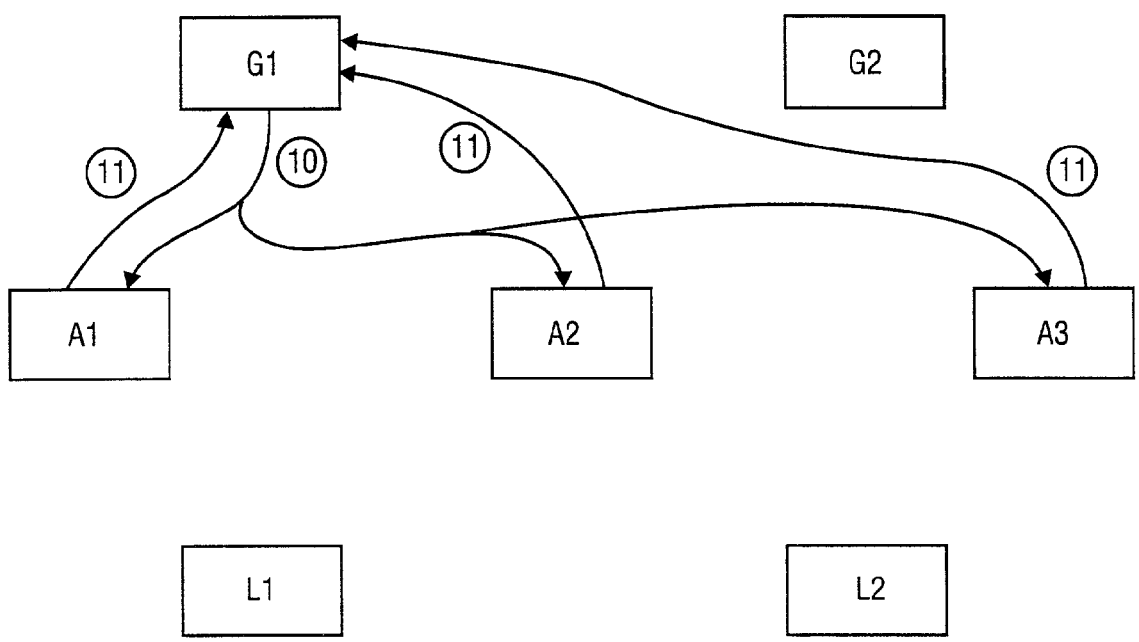

FIG. 4A, FIG. 4B, and FIG. 4C illustrate one embodiment of the invention demonstrating server resiliency. Assume the network has GRM servers G1 and G2, GRM agents A1, A2, and A3, and client LDNSs (local DNSs) L1 and L2. Assume further that initially, all of the nodes in the network system are operative and all links are reachable.

Now in FIG. 4A the following sequence occurs. G1 learns of a new client L1 (1). G1 asks A1, A2, A3 (2) to probe L1 (2.1). A1, A2, A3 then execute the probe and report their proximity to G1 and G2 (3). Then G1 redirects L1 (4) appropriately (4.1 in this example to A1).

Now in FIG. 4B assume that G1 has a hardware failure and is pulled out of service (5), as indicated by dashed lines. If G2 then receives a request from L2 (6), and previously neither G1 or G2 knew about L2, then G2 asks A1, A2, A3 (7) to probe L2 (7.1). A1, A2, A3 then execute the probe and report proximity L2 to G1 and G2 (8) (however, G1 is unreachable, so G1 does not receive the reports). Then G2 redirects L2 appropriately (9, to A1, A2, or A3 based on, for example, lowest latency).

Now in FIG. 4C assume that G1 recovers from the hardware failure and makes a request to the agents to synchronize (10) (to obtain the latest state of the network information). Each of the agents A1, A2 and A3 reports its proximity to L1 and L2 to G1 (11). Thus, G1 has recovered and is now in synchronization with G2.

One of skill in the art will recognize that a similar approach may be used where an agent is taken offline due to a hardware failure, or is disconnected and then reconnected to the network, or is newly added to the network, etc.

In the synchronization example above, the GRM is a "requestor" of synchronization information (via the synchronization request) and the agents are "senders" of the synchronization information (in response to the synchronization request). A sender responding to a synchronization request ("may send two types of update packets: an "all" update or a "delta" update.

For example, if the requestor is a GRM server (as illustrated in FIG. 4C) requesting synchronization information then the sender(s) agent's algorithm to send a packet could be:

1. For each GRM server listed in the serverlist (on each agent), determine if an "all" packet or a "delta" packet should be sent.

Send an "all" packet to a server if a prior update packet was not able to be successfully sent. Send a "delta" packet if all prior update packets have been delivered without error to the server. A "delta" packet just informs of proximity updates to LDNS entries since its last update packet was sent out, whereas an "all" packet informs of all proximity LDNS entries.

2. Construct and send the packet

Figure 5A:
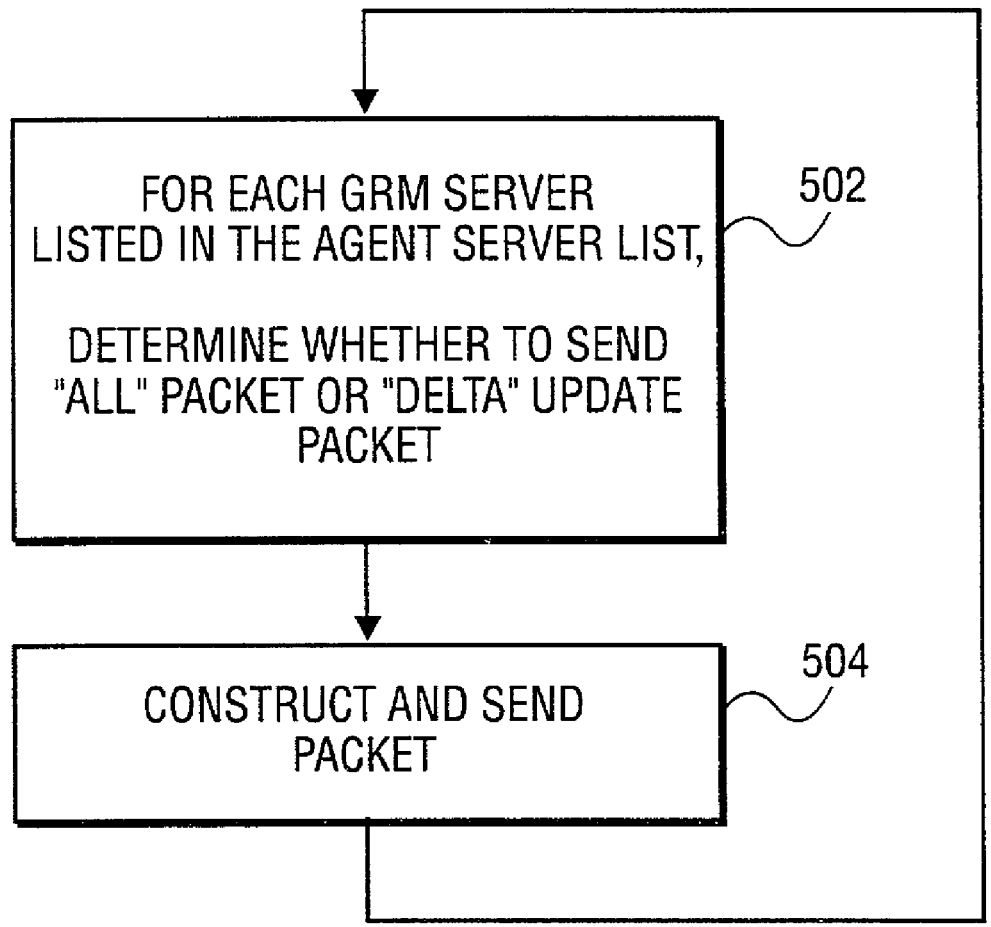
FIGS. 5A and 5B illustrate embodiments in flow chart form of the invention for updating agents and servers.

FIG. 5A illustrates this agent algorithm. At 502 for a specific GRM server, a determination is made to send an "all" or "delta" update packet. The packet is constructed and sent at 504, and then the sequence is repeated for each GRM server listed in the agent's server list (at 502).

If the requestor is an agent (i.e. the agent is now coming back online), then the sender(s) GRM server's algorithm to send a packet could be:

1. For each GRM agent listed in the agentlist (on the GRM server), determine if an "all" packet or a "delta" packet should be sent.

Send an "all" packet to an agent if a prior update packet was not able to be successfully sent. Send a "delta" packet if all prior update packets have been delivered without error to the agent. A "delta" packet just informs of new LDNS entries the GRM server has learnt since its last update packet to the agent, whereas an "all" packet informs of all LDNS entries the GRM server knows about.

2. Construct and sent the packet.

Figure 5B:
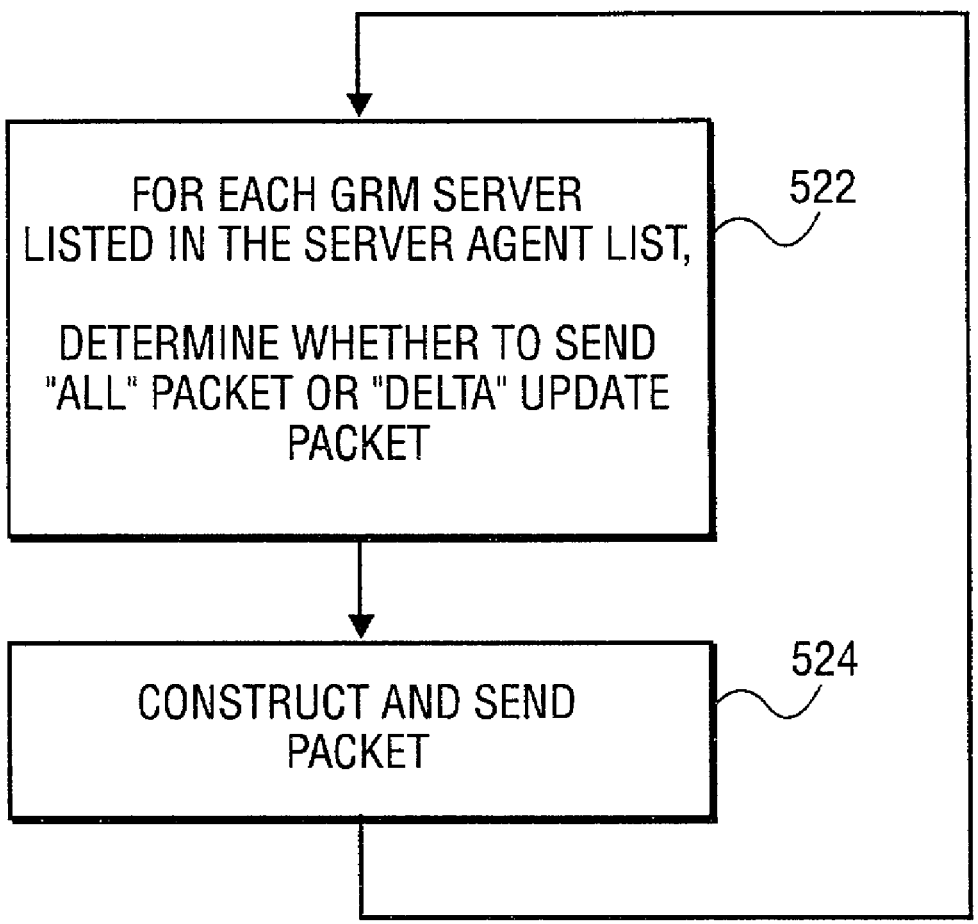

FIG. 5B illustrates this server algorithm. At 522 for a specific GRM agent, a determination is made to send an "all" or "delta" update packet, the packet is constructed and sent

524, and then the sequence is repeated for each GRM agent listed in the server's agent list (at 522).

Many other embodiments for synchronization are possible, some of which are discussed below.

Recovering from Transmission Errors from GRM Agent to GRM Server

1. The GRM agent looks up whether it is synchronized with this particular GRM server or out of sync. (Synchronization here meaning all the packets that this GRM agent has tried to send to the GRM server have been delivered without any problems.)
2. If the GRM server is in sync with respect to the GRM agent the agent constructs a "delta" packet with only changes that occurred since the last time this GRM agent reported.
    If the GRM server is out of sync with respect to this GRM agent, the agent constructs an "all" packet with all the proximity tables. In case there are no "delta" updates, the agent just sends a heartbeat packet with no proximity changes.
3. The GRM agent sends up to 8 kilobytes (KB) of data to the GRM server in each transmission. If the amount of data exceeds 8 KB, the GRM agent will continue with this fragment.
4. The GRM agent then tries connecting to the GRM server, if the connection fails, then the GRM agent marks this GRM server as dirty. (Once the GRM agent has marked the GRM server dirty, it will try sending an "all" packet after two minutes. During this interval, the GRM agent continues to send "delta" packets and eventually after sending the "all" packet (successfully delivered), the GRM agent sends "delta" packets subsequently till it encounters the next error.)
5. The GRM agent tries to send the fragment of packet, if the fragment fails to transmit, it marks the GRM server dirty.
6. If there are more fragments remaining and the GRM agent did not have any error transmitting this fragment, the GRM agent continues from step 3. Once it is done transmitting all the fragments to this GRM server, the GRM agent closes the connection.

Recovering from Transmission Errors from GRM Server to GRM Agent

1. The GRM server looks up whether it is synchronized with this particular GRM agent or out of sync. (Synchronization here meaning all the packets that this GRM server has tried to send to the GRM agent have been delivered without any problems.)
2. If the GRM agent is in sync with respect to the GRM server the server constructs a "delta" packet with only changes that occurred since the last time this GRM server reported.
    If the GRM agent is out of sync with respect to this GRM server, the server constructs an "all" packet with all the proximity tables. 3. The GRM server sends up to 8 kilobytes (KB) of data to the GRM agent in each transmission. If the amount of data exceeds 8 KB, the GRM server will continue with this fragment.
4. The GRM server then tries connecting to the GRM agent, if the connection fails, then the GRM server marks this GRM agent as dirty. (Once the GRM server has marked the GRM agent dirty, it will try sending an "all" packet after two minutes. During this interval, the GRM server continues to send "delta" packets and eventually after sending the "all" packet (successfully delivered), the GRM server sends "delta" packets subsequently till it encounters the next error.)
5. The GRM server tries to send the fragment of packet, if the fragment fails to transmit, it marks the GRM agent dirty.
6. If there are more fragments remaining and the GRM server did not have any error transmitting this fragment, the GRM server continues from step 3. Once it is done transmitting all the fragments to this GRM agent, the GRM server closes the connection.

There are also a variety of embodiments for the construction of packets.

Packet Construction

For example, in an agent to server communication, one embodiment is constructing a packet only once and re-using it. The GRM agent may notice a proximity change that it needs to inform to all the GRM servers. The GRM agent constructs only one "delta" packet and one "all" packet (all packet is constructed only if at least one GRM server is out of sync). The GRM agent then re-uses this "all" or "delta" packet for all the GRM servers. This facilitates the synchronization between the servers, as it makes sure that every server sees the same updates in order.

Another embodiment is in a server to agent communication by constructing a packet only once and re-using it. The GRM server may receive a request from a new client agent that it needs to inform to all the GRM agents. The GRM server constructs only one "delta" packet and one "all" packet (all packet is constructed only if at least one GRM agent is out of sync). The GRM server then re-uses this "all" or "delta" packet for all the GRM agents. This facilitates the synchronization between the agents, as it makes sure that every agent sees the same updates in order.

In the above examples, for simplicity in explanation, the agent probe was for a time latency, however, other network/performance parameters may be reported. For example, a low latency does not guarantee that there is sufficient bandwidth to transfer a large message. Thus, such parameters as the "health" of a connection, load status, etc. may assist in determining how to redirect a client. These and other parameters may be determined by an agent probe and reported back to a server.

In the above examples, for simplicity in explanation, the synchronization was for agent and client lists, and latency, however many other entities may be synchronized by the same techniques. For example, the "latency information" to the client agents is substantially synchronized between one or more servers without a direct communication between one or more servers, however for the servers to make an accurate determination of "closeness" the proximity measurements made to the client agents need to be via the same technique. So, in other embodiments, agents are also synchronized as to the measurement technique to use to the client agent as well as which client agents to measure. It is worth noting that the measurement technique should be synchronized in order for the server to be able to compare measurements from different agents when selecting the lowest latency site. If the agents used different proximity measurement techniques, then the servers would be unlikely to make a correct decision.

Conceptually, the server and the agent have been shown and described as separate entities, however, they may be combined in a single unit, which may also have other capability, such as content caching capability.

Additionally, a server may decide to statically or dynamically redirect a client. Other embodiments may allow for multiple IP addresses to be returned, such that failover and load-balancing may be possible. Under the scenario of multiple IP addresses being returned, the addresses could be "rotated" for each request, thereby achieving a simple load balancing.

The above examples have demonstrated how DNS based routing and application based routing can be used to redirect a client to a "closer" source (e.g., a content cache) for the requested information. The invention is not limited to DNS requests and responses or application requests and responses. For example, rather than a DNS or application request, the request could be for any network accessible resource (such as security parameters, trusted authentication verification, network traffic information, etc.). The invention would then direct the requesting client to the "nearest" source for the information.

Communication Protocol

What follows is a description of one possible embodiment for a communication protocol. The communication protocol is referred to as NCCP (Netcache Communication Protocol). Caches on the net are referred to as NetCaches. Additionally, the following terminology is used. A GRM server is a part of the GRM solution that responds to client DNS lookup requests and returns closest caches. A GRM cache agent resides on caches and does proximity measurements to requesting IP addresses. Requesting IP addresses (LDNS addresses) are DNS servers close to clients (such as web browsers) that request a lookup on behalf of the client to GRM servers.

1. Protocol Overview

A NCCP packet consists of two sections:
 a. header section
 b. data section

Each section has a number of NCCP messages which are {Name,Value} pairs. Each name value pair is terminated with a carriage return. All messages are sent in clear text. The format of each message is: Name:Value followed by a carriage return. NetCaches listen on port 89 for NCCP packets.

1.1. Header Section Messages.

The NCCP header section messages are common to both GRM server and GRM cache agent. The length of the header section is fixed to 128 bytes.

1.1.1. "Protocol"

Identifies the protocol version. Valid values: NCAGENT/1.1 or NCAGENT/1.0

Example: protocol:NCAGENT/1.1

1.1.2. "Content-Length"

Indicates the amount of data being transmitted by the sender and whether the data is fragmented. "FR" indicates fragmentation. "NF" indicates no fragmentation. When the sender sends a "NF" as part of the content length, the receiver should close the socket after reading the "length" number of bytes. In case the sender sends a "FR" as part of the content length, the receiver should read "length" number of bytes and continue to keep the socket open, read the next content length message and subsequently receive the next fragment. This repeats until there are no more fragments remaining.

Valid values: (FR/NF), Any non-zero number.
Example:
content-length:NF 150
content-length:FR 180

1.1.3. "Mode"

Indicates whether the sender of the message is a "cache" or a "grm".

Example: mode:cache 1.1.4. "Time"

Indicates the current time at the sender measured in UTC seconds.

Example: time:519786

1.2. GRM Data Section Messages

The data section length may not exceed 8,192 bytes. In cases where the data section is larger, the packet needs to be fragmented. Each data fragment is prepended by its header (described in 1.1).

1.2.1. "rtt-Updates"

A request from the GRM server to the GRM cache agent indicating that the cache agent should send its entire LDNS entries table to the sender. Used to refresh data structures on boot. Valid values: all Example: rtt-updates:all 1.2.2. "Domains"

Consists of a comma separated list of the domains that are currently being serviced by the GRM. Valid values: valid domain names Example: domains:.netapp.com,.cisco.com,.yahoo.com,.bmw.com 1.2.3. "Nameservers"

Specify default and per domain nameservers that NetCache agents should use. Format: <comma separated list of default backend DNS>;{<domain name1> <backend dns1> <backend dns2>,<domain name2> <backend dns1>}

Example:
nameservers:10.56.16.23, 10.56.16.24;.netapp.com 10.53.44.30 172.30.50.115,.cisco.com 10.56.16.23

For example, assume that the GRM sends a domain string as the one in section 1.2.2 and a corresponding nameservers string as the one above. This would mean that, by default, the agent should use 10.56.16.23 and 10.56.16.24 as the backend DNS unless a per domain DNS is specified.

".netapp.com" would use 10.53.44.30 and 172.30.50.115 as the backend dns.

".cisco.com" would use 10.56.16.23 as the backend dns.

Since there is no per domain backend nameserver specified for yahoo.com and bmw.com, they would use the default backend name servers 10.56.16.23 and 10.56.16.24.

1.2.4. "LDNS"

The "LDNS" attribute is used in messages originating from both the GRM server and cache agent. When originating at a GRM server, it indicates a request to do probes to a particular LDNS using a particular technique. Currently, the valid techniques are ping, dns, and traceroute.

LDNS:<LDNS IP> <technique> <last query time>
Valid probing techniques: ping/dns/traceroute Other techniques: none A technique of none indicates that the cache should hold the LDNS entry in its tables without doing probes to the LDNS.

Example: LDNS:10.32.1.5 ping 51960

Indicates a request from the GRM to a cache to do proximity measurements to 10.32.1.5 using ping as the probing technique. The GRM indicates that the last time a DNS query was received from this host was at time 51960.

1.3 GRM Cache Agent Data Section Messages 1.3.1. "my-ip"

The cache sends its IP address as part of the message. Valid values: IP address

Example: my-ip:10.56.19.134

1.3.2. "Cacheload"

Specifies the cacheload on the cache. A valid value is between 0 and 100, 0 indicating no load and 100 indicating maxed out. The cache load takes the CPU load, disk load and the streaming load into account. Valid values: An integer between 0 and 100.

Example: cacheload:53

1.3.3. "Services"

Indicates the services that are enabled on the cache. Currently these are checked for: HTTP, RTSP, MMS. Valid values: http, rtsp, mms.

Example: services:http,mms 1.3.4. "Domains"

Indicates a request from the GRM cache agent to the GRM server to send domain name information. Valid values: "all"

Example: domains:all 1.3.5. "rtt-Updates"

A request from the GRM cache agent to the GRM server indicating that the GRM server should send its entire LDNS entries table to the cache agent. Used to refresh data structures on boot. Valid values: all Example: rtt-updates:all 1.3.6. "LDNS"

The "LDNS" attribute is used in messages originating from both GRM server and cache agent. When originating at a cache, it indicates a proximity report from the cache about a proximity measurement to a LDNS. The measurement is expressed as round trip time (RTT) in milliseconds (msecs).

Format of Message:

LDNS:<LDNS IP> <RTT in msecs> <method> [<num hops>] [<last hop>] <last query time>

Currently, the valid probing methods are: ping, traceroute and dns.

Example:

LDNS:10.32.1.5 50 ping 51986

LDNS:10.45.2.16 50 traceroute 8 10.45.2.1 52987

The first case says: probes to IP address 10.32.1.5 were made using ping and RTT of 50 msec is reported. The second case says: probes to IP address 10.45.2.16 were made using traceroute. The closest proximity received back from the destination is of 10.45.2.1 which is 50 msec away and 8 hops from this GRM cache agent. The last query time is the same as the last query time it received from the GRM server.

Note that in case the GRM cache agent packets are fragmented, the messages from 1.3.1 to 1.3.5 should be present only in the first fragment. The subsequent fragments should only contain "LDNS" information.

2.0 Transactions Between GRM Cache Agent and GRM Server

The packet exchanged between the cache agents and the GRM server is divided into two sections:

a. a header 128 bytes in length.

b. Data

The "content-length" attribute in the header indicates the length of the data section. In any case, the data section should not exceed 8,192 bytes. In case the GRM server or the GRM agent cache wants to send a chunk of data larger than 8,192 bytes, the data packet should be fragmented and appropriately indicated in the "content-length" attribute described in section 1.1.2.

2.1 Example of Valid Headers 2.1.1 Not Fragmented Header protocol:NCAGENT/1.1 content-length:NF 1200 mode:grm time:5982323222

<data . . .

. . .

. . . >

The transaction above indicates that the sender protocol version is NCAGENT/1.1. It is sending an unfragmented packet, the data section is 1200 bytes in length and that the sender of the packet is a GRM.

2.1.2 Fragmented Header protocol:NCAGENT/1.1 content-length:FR 8192 mode:grm time:53454334343

<8,192 bytes of data . . .

. . . .

. . . > protocol:NCAGENT/1.1 content-length:NF 1000 mode:grm

<1000 bytes of data

. . .

. . . >

The example in 2.1.2 assumes that the sender (a GRM server) wants to send 9,192 bytes of data. This data is split up into two packets and each is attached with its own header. The header of the first packet indicates that there are more fragments present "FR". The header of the second fragment indicates that no more headers are present "NF".

2.2 Data Exchange protocol:NCAGENT/1.1 content-length:NF 1290 mode:cache time:12342424433 my-ip:10.56.19.134 cacheload:12 services:http

LDNS:192.43.1.23 50 ping 59121142

<more LDNS data . . .

. . . >

The length of all the data starting from my-ip to end end of the LDNS data is 1,290 bytes as indicated in the header.

NOTE: The GRM cache agent ignores any other messages that it does not understand.

Thus what has been described is one of a variety of communication protocols.

Backoffs, False Alarms, and Delta Reporting

In one embodiment the GRM agent probes all the LDNS entries in its table periodically, the probe frequency for each entry varies depending on its consistency of results: If the probe results are reported consistent with our previous estimate (for example, a 10% tolerance or within 2 msec, whichever is larger), the agent does an "exponential backoff" for this LDNS entry. That means that if the last period of measurement for this LDNS entry was every 30 seconds, it will now be doubled to every 1 minute. The GRM agent may measure an LDNS entry from as often as twice every minute to as infrequently as twice per day. If the probe results are consistent, it will progress geometrically until twice per day, inconsistent results will reset the measurement frequency to twice per minute.

For example, assume the following:

| Time | 0s | 30s | 1m30s | 3m30s | 7m30s | 15m30s | 31m30s | 32m | 33m | 35m |
|---|---|---|---|---|---|---|---|---|---|---|
| RTT | 10 | 11 | 10 | 11 | 10 | 10 | 7 | 6 | 6 | 6 |
| Interval | 30s | 1m | 2m | 4m | 8m | 16m | 30s | 1m | 2m | 4m |

If the variance in proximity is greater than 60% then the system waits for two probe measurements before treating it as a genuine change.

For example, assume the following:

| RTT | 10 | 10 | 40 | 12 | 11 |
|---|---|---|---|---|---|
| Interval | 30 s | 1 m | 2 m (reject) | 2 m | 8 m |

The measurement 40 is treated as a false alarm because although it was greater than 60%, this is the first time it was received, so the probe keeps the 10 value. Before accepting a greater than 60% change as a genuine change in RTT, at least two greater than 60% changes are needed to accept the new change. So, for example, if the probe had received two 40 measurement, the new estimate would be taken as 40.

A delta packet, as previously mentioned, is changes since last reporting. An agent's delta packet includes all the entries whose proximity changed, for example by 10%, since the last time the agent reported to the GRM server. A GRM server's delta packet contains all the LDNS entries it has learnt since the last time it reported new entries to the agents.

Thus, one skilled in the art will appreciate that the invention has various possible embodiments and offers the following capabilities. The state of a network is fully distributed among the servers such that a client will receive the same results independent of which server is contacted. The invention provides fault resilience so that clients can be redirected accurately even in event of a prior failure. Failures include link failure, packet loss, cache failure, etc. Large scale deployment is possible by the efficient nature of the communication protocol. GRM servers are kept synchronized without any significant communication cost.

Additionally, one of skill in the art will appreciate that since the network is distributed among servers and agents that other capabilities are possible. For example, it is possible for a server and/or agent to temporarily "forget" some of its information in response to short term resource shortages. Since other network nodes also store this information and the server/agent can retrieve it later when the resource shortage has abated, this allows for dynamic reallocation of resources in response to criteria. Thus, for example, if memory used to store DNS entries is better used for caching content on a short term basis this may be done and the entries later restored.

Thus, what has been disclosed is a method and apparatus for a rumor based protocol for distributed state synchronization between request routing servers.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several systems in the form of S servers 104-1 through 104-S and C clients 108-1 through 108-C are connected to each other via a network 102, which may be, for example, an on-chip communication network. Note that alternatively the network 102 might be or include one or more of: inter-chip communications, an optical network, the Internet, an intranet, a Local Area Network (LAN), Wide Area Network (WAN), satellite link, fiber network, cable network, or a combination of these and/or others. The servers may represent, for example: a master device on a chip; a memory; an intellectual property core, such as a microprocessor, communications interface, etc.; a disk storage system; and/or computing resources. Likewise, the clients may have computing, storage, and viewing capabilities. The method and apparatus described herein may be applied to essentially any type of communicating means or device whether local or remote, such as a LAN, a WAN, a system bus, on-chip bus, etc. It is to be further appreciated that the use of the term client and server is for clarity in specifying who receives a service (the client) and who performs the service (the server). No hierarchy is implied unless explicitly stated. Both functions may be in a single device, in which case the client-server and server-client relationship may be viewed as peer-to-peer from outside the device. Thus, if two devices such as 108-1 and 104-S can both perform a service and receive a service, their relationship may be viewed as peer-to-peer. Likewise, the relationship between 104-1 and 104-S, and 108-1 and 108-C may be viewed as peer to peer if each such device is capable of performing a service and receiving a service.

Referring back to FIG. 2, FIG. 2 illustrates a system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system, 202 may be for example, one or more of such buses as an on-chip bus, a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of the system, the system may include some, all, more, or a rearrangement of components in the block diagram. For example, an on-chip communications system on an integrated circuit may lack a display 220, keyboard 224, and a pointer 226. Another example may be a thin client might consist of a wireless hand held device that lacks, for example, a traditional keyboard. Thus, many variations on the system of FIG. 2 are possible.

The invention can be implemented by an apparatus for performing the operations described above. This apparatus may be specially constructed for the such purposes, or it may comprise a general-purpose computer, selectively activated or configured by a computer program stored in the computer. Such a computer program may be stored in a computer readable storage medium, such as, but not limited to, any type of disk including floppy disks, hard disks, optical disks, compact disk-read only memories (CD-ROMs), digital versatile disk (DVD), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network. This communications network is not limited by size, and may range from, for example, on-chip communications to WANs such as the Internet.

The methods of the invention may be implemented using computer software. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical, or other form of propagated signals (e.g., carrier waves, infrared signals, digital signals, etc.); etc.

Thus, a method and apparatus for a rumor based protocol for distributed state synchronization between request routing servers have been described.

What is claimed is:

1. A method for distributing state information throughout a network including two Global Request Manager ("GRM") servers and two GRM agents; the method comprising:
   receiving, at a first GRM server, a Domain Name Service ("DNS") request from a client to obtain a network address corresponding to a domain name;
   in response to the DNS request, transmitting a probe instruction from the first GRM server to a first GRM agent and a second GRM agent, to cause the first GRM agent and the second GRM agent to estimate their network proximity to the client, wherein the first GRM agent and the second GRM agent are designed to estimate network proximity;
   transmitting a response from the first GRM server to the client, said response to indicate a closest device of the first GRM agent and the second GRM agent based on a best guess by the first GRM server of a closest device of the first GRM agent and the second GRM agent;
   receiving, at the first GRM server, proximity estimates from the first GRM agent to the client and the second GRM agent to the client, said proximity estimates made in response to the probe instructions;
   receiving, at a second GRM server, the proximity estimates, wherein the two GRM agents transmit the proximity estimates to the second GRM server automatically in response to the DNS request and wherein only the first GRM server is aware of the DNS request; and
   updating a first database at the first GRM server and a second database at the second GRM server with the proximity estimates, wherein
   the first GRM server and the second GRM server do not communicate directly to share the proximity estimates from the first GRM agent and the second GRM agent.

2. The method of claim 1, further comprising:
   transmitting a response from the first GRM server to the client, said response to indicate a closest device of the first GRM agent and the second GRM agent based on the proximity estimates from the first GRM agent and the second GRM agent.

3. The method of claim 1 wherein the DNS request is to obtain an Internet Protocol ("IP") address corresponding to the domain name.

4. The method of claim 1 wherein the client is a local Domain Name Service ("DNS") device, the method further comprising:
   receiving, at the first GRM agent, a request from a second client to obtain a network resource; and
   transmitting the network resource corresponding to the second request from the first GRM agent to the second client.

5. The method of claim 1 wherein the proximity estimates comprise network latency measurements between the first GRM agent and the client, and between the second GRM agent and the client.

6. The method of claim 1 wherein the proximity estimates comprise information selected from the group consisting of a latency measurement, available network bandwidth, bandwidth in use, computing resources available and network reliability.

7. A machine-readable storage medium storing instructions to cause a programmable processor to perform operations, the operations comprising:
   receiving, at a first GRM server, a Domain Name Service ("DNS") request from a client to obtain a network address corresponding to a domain name;
   in response to the DNS request, transmitting a probe instruction from the first GRM server to a first GRM agent and a second GRM agent, to cause the first GRM agent and the second GRM agent to estimate their network proximity to the client, wherein the first GRM agent and the second GRM agent are designed to estimate network proximity;
   transmitting a response from the first GRM server to the client, said response to indicate a closest device of the first GRM agent and the second GRM agent based on a best guess by the first GRM server of a closest device of the first GRM agent and the second GRM agent;
   receiving, at the first GRM server, proximity estimates from the first GRM agent to the client and the second GRM agent to the client, said proximity estimates made in response to the probe instructions;
   receiving, at a second GRM server, the proximity estimates, wherein the two GRM agents transmit the proximity estimates to the second GRM server automatically in response to the DNS request and wherein only the first GRM server is aware of the DNS request; and
   updating a first database at the first GRM server and a second database at the second GRM server with the proximity estimates, wherein the first GRM server and the second GRM server do not communicate directly to share the proximity estimates from the first GRM agent and the second GRM agent.

8. The machine-readable storage medium of claim 7, containing additional data and instructions to cause the programmable processor to perform operations comprising:

performing periodic measurements of proximity between the client and one of the first GRM agent and the second GRM agent; and reporting a result of a periodic measurement to the first GRM server and the second GRM server.

9. The machine-readable storage medium of claim 8, containing additional data and instructions to cause the programmable processor to perform operations comprising:

reducing a frequency of the periodic measurements if a measurement is within a predetermined tolerance of a previous measurement.

10. A system comprising:

a first GRM agent designed for estimating network proximity from a location of the first GRM agent in a network to a client connected to the network;

a second GRM agent designed for estimating network proximity from a location of the second GRM agent in the network to the client connected to the network; and a first global resource manager ("GRM") server to receive a Domain Name System ("DNS") request from the client to obtain an Internet Protocol ("IP") address corresponding to a domain name, and in response to the request, cause the first GRM agent and the second GRM agent to perform the network proximity measurements and cause a response to be transmitted from the first GRM server to the client indicating a closest location to the client of the first GRM agent and the second GRM agent, the response based on a best guess by the first GRM server, the first GRM server also to receive the network proximity estimates from the first GRM agent and the second GRM agent and to prepare a reply for the client based on the network proximity estimates; and a second GRM server to receive the network proximity measurements directly from the first and second GRM agents automatically in response to the DNS request and wherein only the first GRM server is aware of the DNS request and wherein the first GRM server and the second GRM server do not communicate directly to share the proximity estimates from the first GRM agent and the second GRM agent.

* * * * *